Oct. 5, 1954     P. I. GARTON     2,690,690
SELF-EJECTING CHUCK WRENCH
Filed March 26, 1953
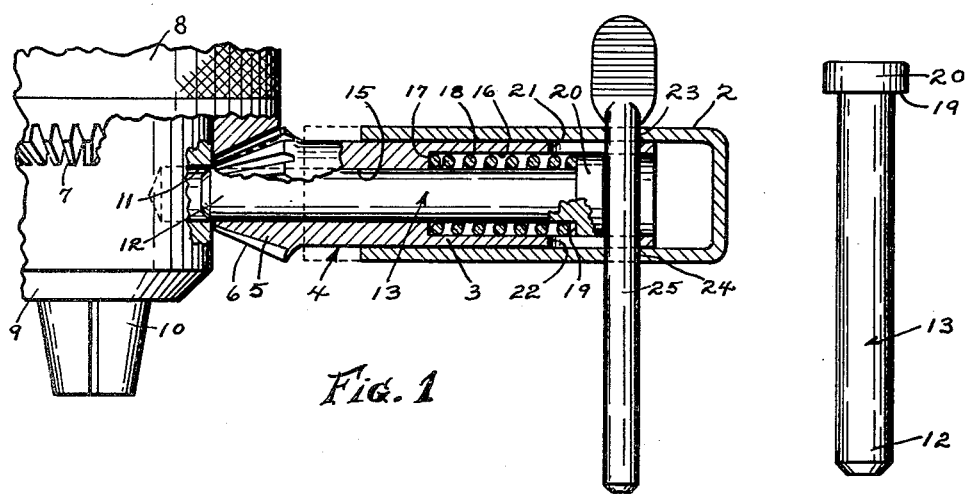
Fig. 1
Fig. 5
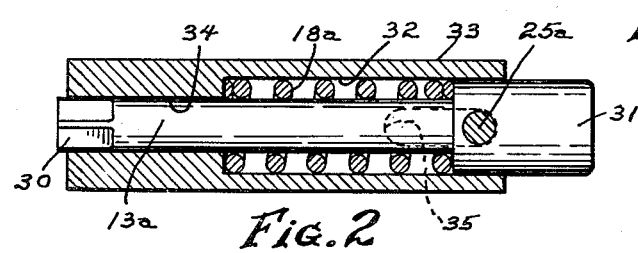
Fig. 2
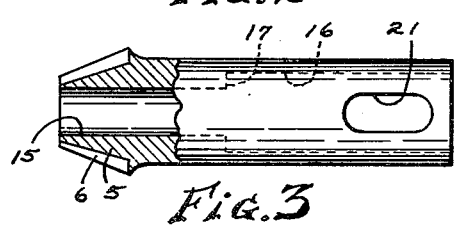
Fig. 3
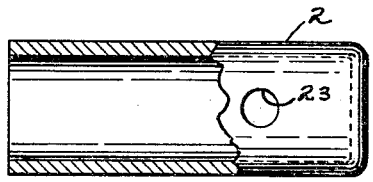
Fig. 4
INVENTOR.
PAUL I. GARTON
BY Lynn H. Latta
ATTORNEY Patented Oct. 5, 1954

2,690,690

UNITED STATES PATENT OFFICE 2,690,690

SELF-EJECTING CHUCK WRENCH

Paul I. Garton, Newberry, Calif.

Application March 26, 1953, Serial No. 344,800

2 Claims. (Cl. 81—90)

This invention relates to a self-ejecting chuck key of a type having a retractible locating pin which causes the key to be automatically detached from its temporary anchorage to the jaw actuating portions of a conventional chuck.

The general object of the invention is to provide an improved type of self-ejecting key in which the few parts that make up the key, lend themselves to economical manufacturing technique.

Another object of the invention is to provide a key which is simple in construction and which is easy to handle and operate.

Other objects and advantages will become apparent upon examination of the following specification and the appended drawing in which:

Fig. 1 is a sectional view of one form of my invention illustrating a portion of a conventional jaw chuck;

Fig. 2 is a sectional view of another form of my invention;

Fig. 3 is a detail view, partly in section, of the pinion of Fig. 1;

Fig. 4 is a detail view, partly in section, of the outer sleeve of Fig. 1; and

Fig. 5 is a detail view of the locating pin of Fig. 1.

Referring to Figs. 1, 3, 4 and 5 I have shown one form of my invention in which this self ejecting key is particularly suited for use with a conventional drill chuck. An outer sleeve 2 is telescopically positioned on the shank 3 of the pinion member which is generally designated by the numeral 4. A pinion 5 is formed at the head of the pinion member and the gear teeth 6 may vary in size and pitch depending upon the size of the chuck with which the key will be used. The gear teeth 6 mesh with the mating gear teeth 7 on the chuck collar 8. The chuck core 9 within which the chuck jaws 10 are received has a bore 11 into which the free end 12 of the locating pin, generally designated by the numeral 13, projects during the operation of the loosening or tightening of the chuck jaws. Usually there are 3 or more of these locating bores spaced equidistantly about the circumference of the chuck core. The function of the locating pin in being inserted into the bore 11 is, of course, to locate the gear teeth on the key with the gear teeth on the chuck so that they become properly meshed and also to provide the bearing support for the rotation of the pinion member during the opening or closing of the chuck jaws.

The pinion member 4 has an axial bore 15 and a counterbore 16 forming an annular shoulder 17 at its base. A compression spring 18 is telescopically positioned on the shank of the locating pin 13 and abuts the annular shoulder 19 formed by the head 20 at the end of the locating pin. A pair of elongated slots 21 and 22, diametrically opposed and in registry with each other, are formed in the circumferential wall of the pinion member 4. The sleeve 2 is provided with diametrically opposed and registered holes 23 and 24 through which the handle 25 projects, the handle 25 projecting through the registered slots 21 and 22 also. The handle 25 preferably has a light pressed fit in the holes of the outer sleeve to maintain the various parts of the key in permanently assembled relationship. The spring 18 continuously urges the head of the locating pin against the handle 25 and the handle in turn is continuously urged to the extremities of the elongated slots 21 and 22 as shown in Fig. 1. In this position the free end of the locating pin is retracted within the bore 15 until only a small portion protrudes beyond the end face of the pinion member, this portion being desirable to locate the pin for initial entry into bore 11.

After positioning the key for initial entry of the pin into the bore 11 the operator exerts manual pressure against the end of sleeve 2 while having one or more fingers gripped about the handle 25. The pin is thus forced fully into bore 11 while the teeth of the pinion are meshed with the teeth on the chuck collar. Then the key is rotated with handle 25 affording the necessary leverage. The pinion member, of course, rotates along with the handle and outer sleeve of the key, the sleeve 2, pin 13 and handle 25 being first moved axially of the pinion member within the limits of the elongated slots 21 and 22 (the movement of the sleeve being indicated in dotted lines in Fig. 1) until the locating pin is fully inserted within bore 11. After the chuck jaws are actuated as desired, the manual end pressure on sleeve 2 is released and spring 18 retracts the pin, handle and outer sleeve relative to the pinion member and the key is automatically disengaged from the chuck.

In the conventional non-self ejecting chuck key the extent of penetration of the locating stud into the bore of the chuck core is such that unless the key is manually withdrawn after use, the key will remain in inserted position and rotation of the drill chuck will fling the key loose and injury to nearby attendants or property may result.

In the form of the invention shown in Fig. 2

I have provided a key of a type which may be particularly suitable for use with a chuck, such as a scroll type, wherein the locating pin 13a has a squared end 30 for insertion into a square type bore in a chuck collar (not shown) for actuating the chuck jaws. The locating pin has an elongated head 31 reciprocably journalled in the counterbore 32 of sleeve 33, the shank of the pin being journaled in the bore 34 adjacent the counterbore. The sleeve is provided with registered and diametrically opposed elongated slots 35 (only one being shown in dotted lines in Fig. 2) through which the handle 25a projects. Compression spring 18a continuously urges the pin and handle to the outer extremity of the elongated slots and the squared end of the pin is retracted sufficiently far within the sleeve to assure that the key will automatically become disengaged when the manual axial pressure exerted on the end of head 31 is released.

I claim:

1. A self-ejecting chuck key comprising: a pinion member; said pinion member including a pinion head and an elongated shank fixed thereto, said pinion member having a bore extending therethrough and a counterbore extending partly therethrough, the shank having opposed elongated slots in registry with each other, said slots being located in the region of and communicating with the counterbore; a sleeve telescopically positioned on the shank, a handle projecting through opposite walls of the sleeve and also projecting through both of the shank slots, said sleeve being longitudinally movable relative to the shank within the limits permitted by engagement of the handle with either of the opposite ends of the shank slots, a pin including a shank and a head, the pin shank being journalled coaxially within the bore of the pinion shank and the head being journalled coaxially within the counterbore of the pinion shank, a compression spring telescopically positioned on the pin shank and having its ends abutting in one instance the shoulder formed at the base of the counterbore and in the other instance the shoulder formed by the head of the pin, said spring continuously urging the head of the pin in a direction away from the base of the counterbore.

2. A self-ejecting chuck key comprising: a hollow pin guide including a pinion head for engaging the teeth of a chuck and a shank, a locating pin coaxially journalled within the pin guide for axial sliding longitudinal movement relative thereto, a head at one end of the pin, said hollow pin guide having a shoulder intermediate its ends and interiorly thereof, said shoulder being axially spaced from the pin head, a compression spring positioned within the pin guide and having its opposite ends abutting in one instance the shoulder and in another instance the pin head; a sleeve telescopically positioned on the exterior surface of the pin guide; the wall of the pin guide having an elongated slot therein, said slot being greater in length than in width; a handle carried by the sleeve and having a portion projecting through the slot into the path of longitudinal movement of the locating pin, said spring continuously urging the locating pin against the handle whereby to normally hold the handle and sleeve in a retracted position at one end of the slot.

References Cited in the file of this patent

UNITED STATES PATENTS

| Number | Name | Date |
| --- | --- | --- |
| 2,215,621 | Slavik | Sept. 24, 1940 |
| 2,387,981 | Davis | Oct. 30, 1945 |
| 2,442,717 | Willette | June 1, 1948 |
| 2,618,995 | Droege | Nov. 25, 1952 |